(12) United States Patent
Kean

(10) Patent No.: US 8,374,556 B2
(45) Date of Patent: Feb. 12, 2013

(54) METHOD FOR DETERMINING AUDIO BROADCAST TRANSMISSION SIGNAL COVERAGE

(75) Inventor: John C. Kean, Falls Church, VA (US)

(73) Assignee: National Public Radio, Inc., Washington, DC (US)

(*) Notice: Subject to any disclaimer, the term of this patent is extended or adjusted under 35 U.S.C. 154(b) by 374 days.

(21) Appl. No.: 12/739,260

(22) PCT Filed: Nov. 3, 2008

(86) PCT No.: PCT/US2008/082284
§ 371 (c)(1),
(2), (4) Date: Aug. 2, 2010

(87) PCT Pub. No.: WO2009/059320
PCT Pub. Date: May 7, 2009

(65) Prior Publication Data
US 2010/0296563 A1 Nov. 25, 2010

Related U.S. Application Data

(60) Provisional application No. 60/984,421, filed on Nov. 1, 2007.

(51) Int. Cl.
*H04B 17/00* (2006.01)

(52) U.S. Cl. .......... 455/67.7; 455/63.1; 455/67.11; 455/67.13; 455/192.2; 455/182.2; 455/258; 375/344; 375/296; 375/346; 375/348; 375/147

(58) Field of Classification Search .............. 455/67.7, 455/182.2, 192.2, 63.1, 67.13, 258, 67.11
See application file for complete search history.

(56) References Cited

U.S. PATENT DOCUMENTS

| | | | | | |
|---|---|---|---|---|---|
| 5,949,796 | A | * | 9/1999 | Kumar | 370/529 |
| 6,047,171 | A | * | 4/2000 | Khayrallah et al. | 455/266 |
| 6,154,547 | A | * | 11/2000 | Whitecar | 381/94.2 |
| 6,178,314 | B1 | * | 1/2001 | Whikehart et al. | 455/188.1 |
| 6,246,698 | B1 | * | 6/2001 | Kumar | 370/487 |
| 7,221,917 | B2 | * | 5/2007 | Kroeger | 455/192.2 |
| 7,653,120 | B2 | * | 1/2010 | Chen et al. | 375/141 |
| 7,693,501 | B2 | * | 4/2010 | Cowley et al. | 455/296 |

* cited by examiner

*Primary Examiner* — Marceau Milord
(74) *Attorney, Agent, or Firm* — Wilmer Cutler Pickering Hale and Dorr LLP

(57) ABSTRACT

Computer implemented methods and systems for the prediction of the reception of a desired in-band on-channel digital audio broadcast signal (IBOC DAB) are described. A method includes computing a first ratio of a weaker undesired adjacent broadcast signal to a stronger undesired adjacent broadcast signal; computing a second ratio of the desired IBOC DAB signal to the stronger undesired adjacent roadcast signal. The method also includes computing a minimum allowable reception ratio based on the second ratio and the slope and intercept of a line, wherein the slope and intercept of the line is based on both (i) a plurality of ratios of a weaker adjacent broadcast signal to a stronger adjacent broadcast signal and (ii) a plurality of ratios of a desired IBOC DAB signal to a stronger adjacent broadcast signal. Reception is predicted when the computed minimum allowable reception ratio is less than the first ratio.

28 Claims, 10 Drawing Sheets

METHOD FOR DETERMINING AUDIO BROADCAST TRANSMISSION SIGNAL COVERAGE

CROSS-REFERENCE TO RELATED APPLICATIONS

This application claims the benefit under 35 U.S.C. 119(e) of U.S. Provisional Patent Application No. 60/984,421, filed on Nov. 1, 2007, hereby incorporated by reference herein in its entirety.

BACKGROUND OF THE INVENTION

1. Field of the Invention

The invention relates generally to the field of radio frequency transmissions. The invention relates more particularly to methods and systems for determining signal coverage of in-band on-channel digital audio broadcast transmissions. More specifically, the invention relates to methods and systems for accurately predicting the coverage of such signals using a computer implemented prediction model and modeling system.

2. Description of the Related Art

On Oct. 11, 2002, In-Band On-Channel Digital Audio Broadcasting ("IBOC DAB") was selected by the U.S. Federal Communications Commission ("FCC") as the technology enabling AM and FM radio broadcast stations to commence digital operations. The FCC announced notification procedures that allowed operating AM and FM radio stations to begin digital transmissions immediately on an interim basis using the IBOC system developed by iBiquity Digital Corporation ("iBiquity"). Since the adoption of IBOC DAB by the FCC, more than 1800 radio stations in the U.S. have opted to begin transmitting digitally, in addition to their regular analog broadcast mode. Further details of IBOC DAB (and radio broadcast in general) can be found in *The IBOC Handbook—Understanding HD Radio Technology*, by David P. Maxson, ISBN: 978-0-240-80844-4, Focal Press, 2007, *HD Radio Implementation: The Field Guide for Facility Conversion*, Thomas R. Ray, III, ISBN 0240810023, 978-0-240-810027, Focal Press, 2008, and *National Association of Broadcasters Engineering Handbook*, 10th Edition, Edmund A. Williams Editor-in-Chief, ISBN: 978-0-240-807515, Elsevier Inc., 2008, all of which are hereby incorporated by reference in their entireties.

In keeping with the FCC's goal of a common technical standard, on Apr. 16, 2005, the Digital Audio Broadcast Subcommittee of the National Radio Systems Committee (NRSC) approved NRSC-5 as a broadcast standard. There NRSC-5 broadcast standard is hereby incorporated by reference in its entirety. On May 18, 2005, the Consumer Electronics Association and the National Association of Broadcasters, co-sponsors of the NRSC, submitted NRSC-5 to the FCC for public consideration in MM Docket No. 99-325.

The mechanism for potential signal interference is derived from the technique by which IBOC DAB is transmitted. The following excerpt from the FCC's First Report and Order describes the transmission technique: "The iBiquity IBOC systems tested by the NRSC are "hybrids" in that they permit the transmission of both the analog and digital signals within the spectral emission mask of a single AM or FM channel. In the hybrid mode, the iBiquity system places digital information on frequencies immediately adjacent to the analog signal. The digital signals are transmitted using orthogonal frequency division multiplexing (OFDM)."

Broadcast stations must be separated in distance according to the relative spacing between their allocated frequencies. For spectral efficiency, frequencies are reused many times across the country, with the result that stations on the same channel and first-, second- and third-adjacent channels are separated at specific minimum distances. The minimum separation distances were determined by the FCC decades ago, based on estimates of signal interference ratios required by analog radios and predictions of radio signal propagation. Although, the NRSC-5 standard describes the principles on which IBOC DAB is to be encoded and transmitted, it does not describe minimum requirements for IBOC reception.

The FCC engineered channel-to-channel frequency spacing for the channel widths of analog radio transmission prior to the introduction of IBOC DAB. As can be seen in the simplified spectrum diagram of FIG. 2, standard frequency separations result in overlap between the undesired 1st adjacent channel signal 202 and the IBOC sidebands 204, resulting in a low desired-to-undesired signal ratio for the IBOC signal. Lesser degrees of overlap may occur as well, as with the upper $1^{st}$ adjacent channel signal 208 to the upper desired channel sidebands 206, which result in a higher desired-to-undesired ratio. Undesired signals may appear on only one side of the desired channel, on both upper 208 and lower channels 202, and in various combinations of signal ratios.

Due to IBOC DAB's transmission of two groups of sidebands, successful reception involves a complex relationship between the signal ratios of the adjacent interfering stations and the desired IBOC station. Accordingly, while predicting simple analog signal coverage is comparatively straightforward, determination of actual usable signal coverage of IBOC DAB has required empirical data based on field measurements. There is a need for the ability to predict, on the basis of input data about signal levels (field strengths) of the desired and undesired channels, whether IBOC DAB will be received or not received, due to signal interference.

SUMMARY OF THE INVENTION

Embodiments of the invention include a computer implemented method of predicting the reception of a desired in-band on-channel digital audio broadcast signal, the method includes computing a first ratio of the field strength of a weaker undesired adjacent broadcast signal to the field strength of a stronger undesired adjacent broadcast signal and computing a second ratio of the field strength of the desired in-band on-channel digital audio broadcast signal to the field strength of the stronger undesired adjacent broadcast signal. This method also includes computing a minimum allowable reception ratio based on the second ratio and the slope and intercept of a line, wherein the slope and intercept of the line is based on both (i) a plurality of ratios of a weaker adjacent broadcast signal to a stronger adjacent broadcast signal and (ii) a plurality of ratios of a desired in-band on-channel digital audio broadcast signals to a stronger adjacent broadcast signal. Based on the above calculations, the method predicts reception of the in-band on-channel digital audio broadcast signal when the computed minimum allowable reception ratio is less than the first ratio.

In any embodiment of the invention, the weaker undesired adjacent broadcast signal may occupy either the upper or lower adjacent broadcast channel while the stronger undesired adjacent broadcast signal occupies the alternate adjacent broadcast channel.

Embodiments of the invention also include where the field strengths of the weaker undesired adjacent broadcast signal, the stronger undesired adjacent broadcast signal, and the desired in-band on-channel digital audio broadcast signal, are predicted field strengths. These predicted field strengths can be based on operating parameters for a transmitter of the desired in-band on-channel digital audio broadcast signal, and terrain data. In some embodiments of the invention, the weaker undesired adjacent broadcast signal is a lower adjacent broadcast signal and the stronger undesired adjacent broadcast signal is an upper adjacent broadcast signal.

Embodiments of the invention also include predicting no reception of the desired in-band on-channel digital audio broadcast signal when the RF signal power of the desired signal is less than about −77 dBm. Embodiments of the invention also include those in which the slope of the line is about 1.4 and the intercept of the line is about 30. In some embodiments of the invention, the minimum allowable reception ratio is computed by multiplying the second ratio by the slope of the line and adding the result to the intercept of the line. In some embodiments of the invention, the slope and intercept of the line are adjusted based on a receiver for which a reception prediction is being made. Embodiments of the invention also include one or more forms of output, including visual output. In some embodiments of the invention, visual of graphic representation such as a map, is generated based on a plurality of predictions of reception of a desired in-band on-channel digital audio broadcast signal.

Embodiments of the invention also include a system for predicting the reception of a desired in-band on-channel digital audio broadcast signal. The system includes a processor for (a) computing a first ratio of the field strength of a weaker undesired adjacent broadcast signal to the field strength of a stronger undesired adjacent broadcast signal; (b) computing a second ratio of the field strength of the desired in-band on-channel digital audio broadcast signal to the field strength of the stronger undesired adjacent broadcast signal; (c) computing a minimum allowable reception ratio based on the second ratio and the slope and intercept of a line, wherein the slope and intercept of the line is based on both (i) a plurality of ratios of a weaker adjacent broadcast signal to a stronger adjacent broadcast signal and (ii) a plurality of ratios of a desired in-band on-channel digital audio broadcast signals to a stronger adjacent broadcast signal. Based on the computations the system predicts reception of the in-band on-channel digital audio broadcast signal when the computed minimum allowable reception ratio is less than the first ratio.

In some embodiments of the invention, the field strengths of the weaker undesired adjacent broadcast signal, stronger undesired adjacent broadcast signal, and desired in-band on-channel digital audio broadcast signal, are predicted field strengths. In some embodiments of the invention, the predicted field strengths are based on operating parameters for a transmitter of the desired in-band on-channel digital audio broadcast signal, and terrain data.

Embodiments of the invention also include the system predicting no reception of the desired in-band on-channel digital audio broadcast signal when the RF signal power of the desired signal is less than about −77 dBm. Embodiments of the invention also include those in which the slope of the line is about 1.4 and the intercept of the line is about 30. In some embodiments of the invention, the system computes the minimum allowable reception ratio by multiplying the second ratio by the slope of the line and adding the result to the intercept of the line.

Embodiments of the invention also include a display for displaying a map generated from a plurality of predictions of reception of a desired in-band on-channel digital audio broadcast signal.

Embodiments of the invention also include a computer implemented method of predicting the reception of a desired in-band on-channel digital audio broadcast signal among a plurality of undesired broadcast signals. The desired in-band on-channel digital audio broadcast signal is an audio component of a hybrid broadcast signal that also includes an analog component, and the plurality of undesired broadcast signals include at least a weaker adjacent signal and a stronger adjacent signal, both of which interfere with the reception of the desired in-band on-channel digital audio broadcast signal. The method of predicting reception includes computing, using the field strength of the desired in-band on-channel digital audio component, the weaker adjacent signal, and the stronger adjacent signal, a prediction of reception of the desired in-band on-channel digital audio component at a particular location. The method also includes determining a linear relationship based on (i) a plurality of ratios of the field strength of a weaker adjacent signal to a stronger adjacent signal and (ii) a plurality of ratios of a desired in-band on-channel digital audio component to a stronger adjacent signal. The method also includes determining the slope and intercept of the linear relationship and generating a result by multiplying the slope by a ratio, wherein the ratio is the field strengths of the desired in-band on-channel digital audio component at particular location, to the stronger adjacent signal at that location. The method also includes adding to the result the intercept of the linear relationship, and predicting reception when the result is less than the ratio of the field strength of the weaker adjacent signal to the stronger adjacent signal at the location.

Embodiments of the invention also include those in which the field strengths of the weaker adjacent signal, stronger adjacent signal, and desired in-band on-channel digital audio components, are predicted field strengths. In some embodiments of the invention, the predicted field strengths are based on operating parameters for a transmitter of the desired in-band on-channel digital audio broadcast component, and terrain data. In some embodiments of the invention, the slope of the linear relationship is about 1.4 and the intercept of the line is about 30. Embodiments of the invention also include generating a map based on a plurality of predictions of reception of a desired in-band on-channel digital audio component. In some embodiments of the invention, the linear relationship is adjusted based on a receiver for which a reception prediction is being made.

Embodiments of the invention also include a system for predicting the reception of a desired in-band on-channel digital audio broadcast signal among a plurality of undesired broadcast signals, including those in which the desired in-band on-channel digital audio broadcast signal is an audio component of a hybrid broadcast signal that also includes an analog component, and where the plurality of undesired broadcast signals include at least a weaker adjacent signal and a stronger adjacent signal both of which interfere with the reception of the desired in-band on-channel digital audio broadcast signal. The system includes a processor for computing, using the field strength of the desired in-band on-channel digital audio component, the weaker adjacent signal, and the stronger adjacent signal, a prediction of reception of the desired in-band on-channel digital audio component at a particular location. The processor (a) determines a linear relationship based on (i) a plurality of ratios of the field strength of a weaker adjacent signal to a stronger adjacent signal and (ii) a plurality of ratios of a desired in-band on-channel digital audio component to a stronger adjacent signal. The processor also (b) determines the slope and intercept of the linear relationship, and generates a result by multiplying the slope by a ratio, where the ratio is the field strengths of the desired in-band on-channel digital audio component at particular location, to the stronger adjacent signal at that location. The process then adds to the result, the intercept of the linear relationship. The system predicts reception when the result is less than the ratio of the field strength of the weaker adjacent signal to the stronger adjacent signal at the location.

In some embodiments of the invention, the field strengths of the weaker adjacent signal, stronger adjacent signal, and desired in-band on-channel digital audio components, are predicted field strengths. In some embodiments of the invention, the predicted field strengths are based on operating parameters for a transmitter of the desired in-band on-channel digital audio broadcast component, and terrain data. In some embodiments of the invention the slope of the linear relationship is about 1.4 and the intercept of the line is about 30.

Embodiments of the invention also include a display for displaying a map generated based on a plurality of predictions of reception of a desired in-band on-channel digital audio component. In some embodiments of the invention, the linear relationship is adjusted based on a receiver for which a reception prediction is being made.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements:

FIG. 1B illustrates the addition of IBOC emissions to an actual broadcast station (in this case, FM, although the emissions of AM IBOC are very similar). The analog FM station broadcast is shown with the addition of lower 106 and upper 108 IBOC DAB sub-carriers, these sub-carriers extend from approximately 120 to 200 kHz above and below the FM carrier frequency. It is apparent from FIG. 1B that that the IBOC DAB sub-carriers actually operate within the upper and lower adjacent channels adjacent to the host.

DETAILED DESCRIPTION OF EMBODIMENTS OF THE INVENTION

Embodiments of the invention provide systems and methods for predicting whether in-band on-channel digital audio broadcast signals will be successfully received. The methods include evaluating the amplitude of digitally modulated upper and lower sub-carrier groups of the desired signal channel relative to the individual amplitudes of potentially interfering signals on channels above and below the desired signal channel. Based on the evaluation of these relative signal amplitudes, predictions can be made to determine the limits of radio reception provided by in-band on-channel digital audio broadcast transmissions.

Such limits of reception may be determined at specific locations using measured values of the previously mentioned signal amplitudes. By performing the prediction at multiple locations, a map of where in-band on-channel digital audio broadcast signals are receivable, and where signals are not receivable, can be made. Embodiments of the invention can be applied to any IBOC DAB signals, for example, broadcast of FM or AM signals with digital sidebands.

Embodiments of the invention can also be combined with field strength prediction systems and models, so that predicted amplitudes of the potentially interfering signals, the digitally modulated upper and lower sub-carrier groups, and the desired signal channel are used to predict signal coverage.

It has been determined that IBOC DAB receivers are susceptible to signal interference in very consistent ratios. When IBOC interference results from a single adjacent-channel signal, the ratio remains fairly constant over the dynamic range of the receiver's input amplifiers. (This interference behavior is similar to analog (non-IBOC) receivers and is familiar to receiver engineers.)

Figure 3:
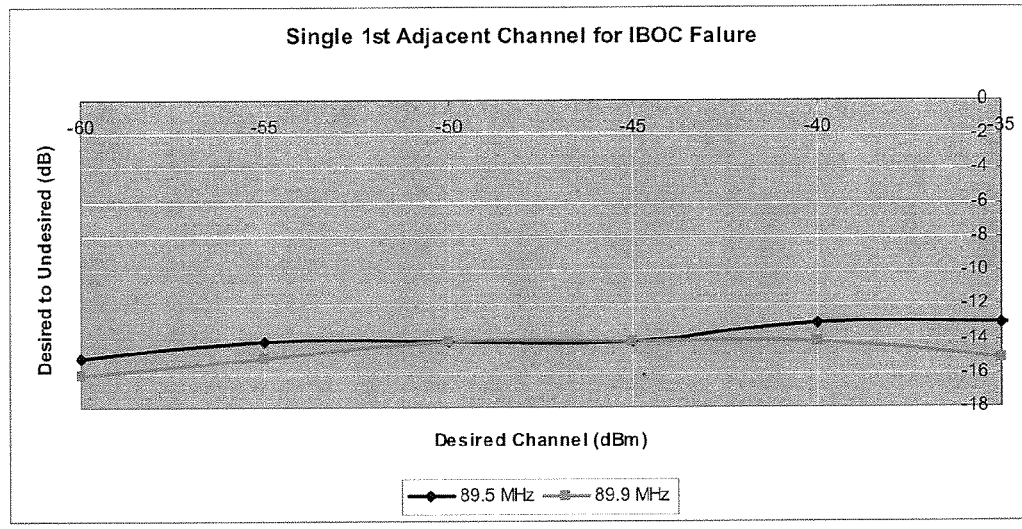
FIG. 3 is a graph showing the threshold ratio of a single desired to undesired 1st-adjacent channel signal interference (causing IBOC reception failure) for a sample receiver.

FIG. 3 shows the ratio of desired-to-undesired signals at which reception failure occurs for a commercially-produced FM-band IBOC receiver with desired signal frequency of 89.7 MHz and interfering signals of 89.5 MHz and 89.9 MHz. It is apparent that despite a large variation in desired signal on 89.7 MHz, from −60 dBm (decibels relative to a milliwatt) to −35 dBm, the power ratio of a single undesired signal at IBOC reception failure remains approximately 14 dB stronger than the desired, resulting in the low (negative dB) desired-to-undesired ("D/U") ratio. The ratio is approximately the same for single adjacent-channel interference on both 89.5 MHz (lower 1st-adjacent) and 89.9 MHz (upper 1st-adjacent). The numeric values discussed herein are receiver-dependent and are supplied for illustration of the invention. Values derived from other receivers, or an average of receiver performance, may be used. All signal powers, including the IBOC DAB signal, are represented in terms of the analog FM host; since analog FM signals of other stations are a primary source of interference, this provides a common basis for calculating signal ratios.

Using its dual data-subcarriers, IBOC DAB reception may successfully receive with data from either the upper and lower carrier groups. Contrary to the IBOC receiver behavior of single-first adjacent interference noted above, the receivers respond in a distinctly different manner when two interfering signals occur on alternate sides (channels above and below) of the desired signal. If interference occurs to only one group, the IBOC receiver can use data from the other, unimpaired group until interference overwhelms the receiver at low D/U ratios.

Figure 1A:
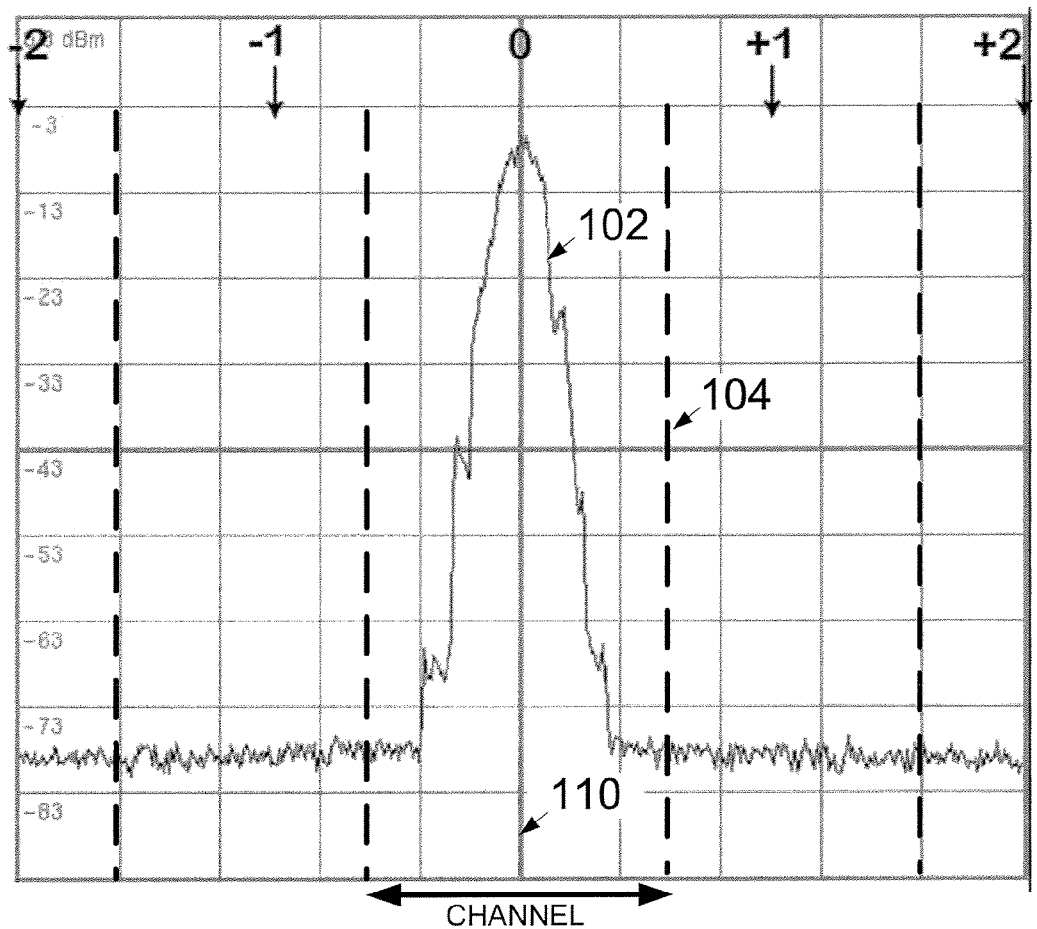
FIG. 1A is a spectrum graph of an FM station transmitting in analog-only mode. The FM sideband energy 102 decreases at frequencies farther from the carrier frequency 110, at center of the chart. Analog FM channels are assigned a width of 200 kHz (±100 kHz of each FM carrier frequency), as indicated by the vertical dashed lines 104.
Figure 1B:
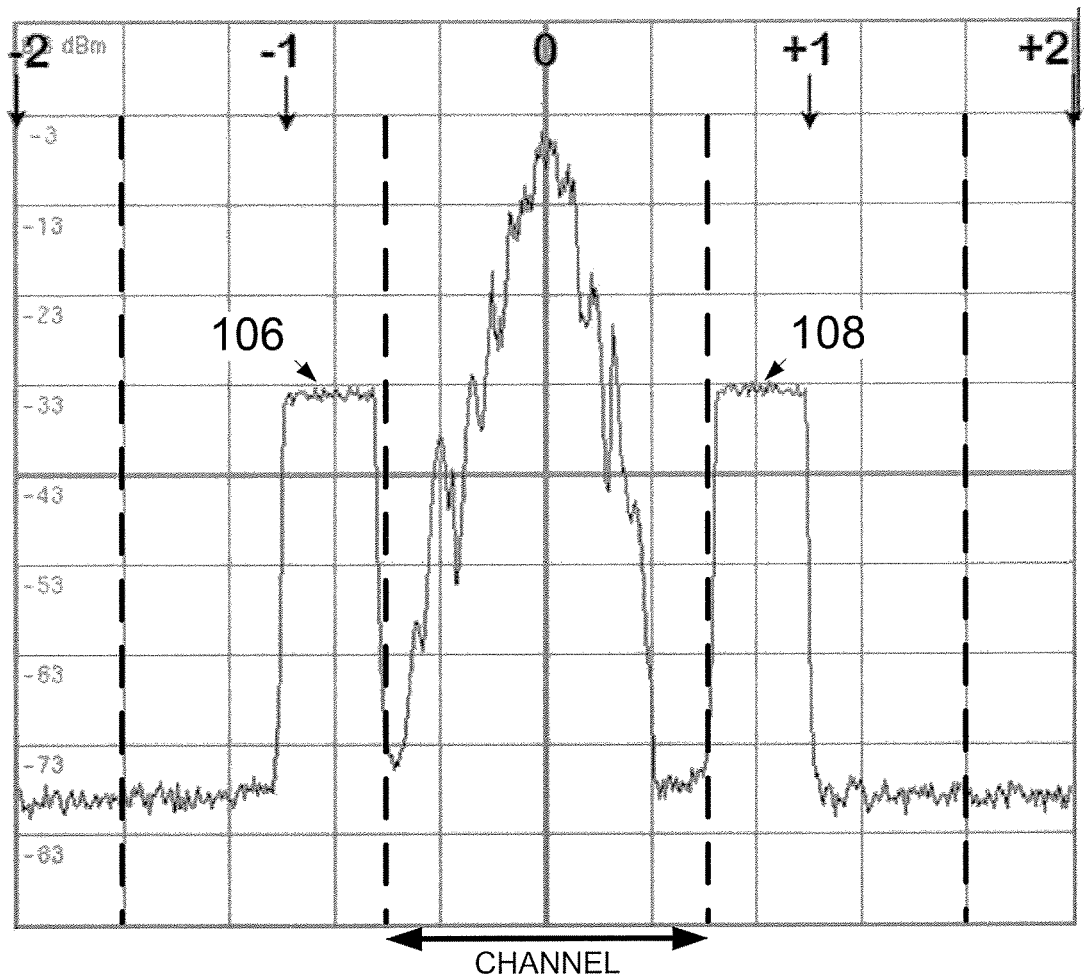
FIG. 1B is a spectrum graph of a hybrid FM radio broadcast with an analog center signal and digital side band signals.
Figure 2:
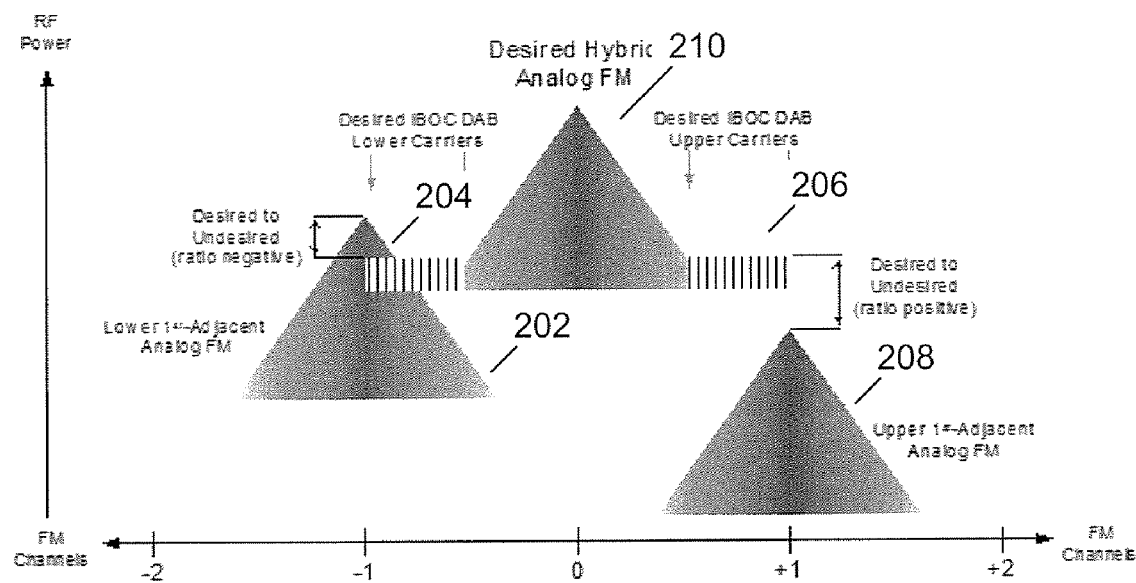
FIG. 2 is a diagram showing the overlap between desired channel IBOC sidebands and adjacent-channel stations. Lower adjacent and upper-adjacent interfering stations are also shown, with RF levels greater than, and lower than, IBOC carriers.
Figure 4:
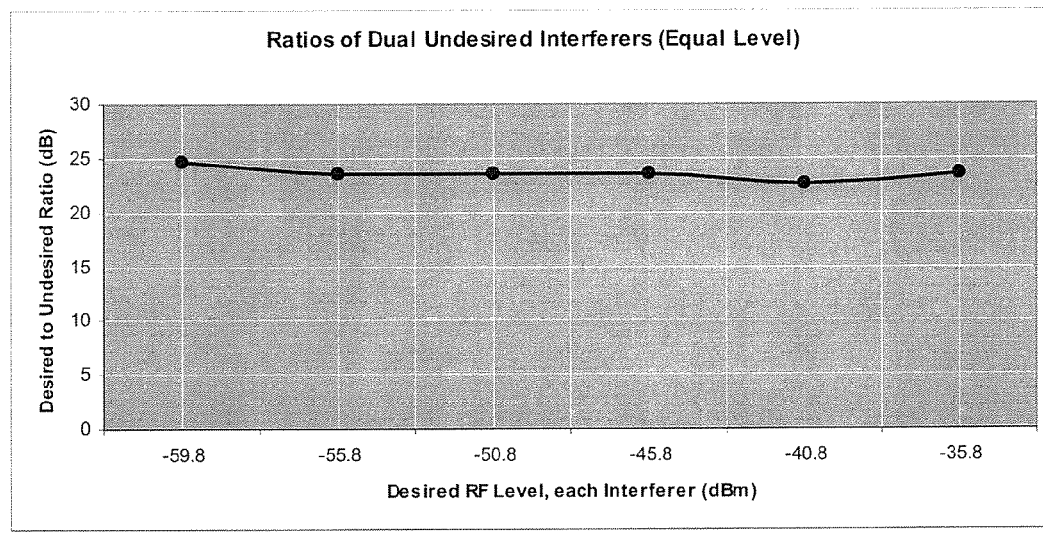
FIG. 4 is a graph showing threshold interference ratios resulting from dual adjacent-channel interference occurring at equal power on both lower and upper-adjacent channels.

It is possible for interference to occur simultaneously from interfering stations on both lower- and upper-adjacent channels of the desired station, as illustrated in FIG. 2. FIG. 4 shows the signal ratios of desired and dual first-adjacent channel interference to cause threshold interference where both interferers are equal in amplitude. It is apparent that, as in FIG. 3, the D/U ratio remains relatively constant for a wide range of desired signal powers. However, the magnitude of the ratio has changed from approximately −14 dB for the single-interferer case to approximately +24 dB for the dual-interferer case. FIG. 4 illustrates the impact of dual-adjacent interferers on IBOC reception, although conditions in which powers of the two interfering signals are precisely equal would be extremely unlikely.

Figure 5:
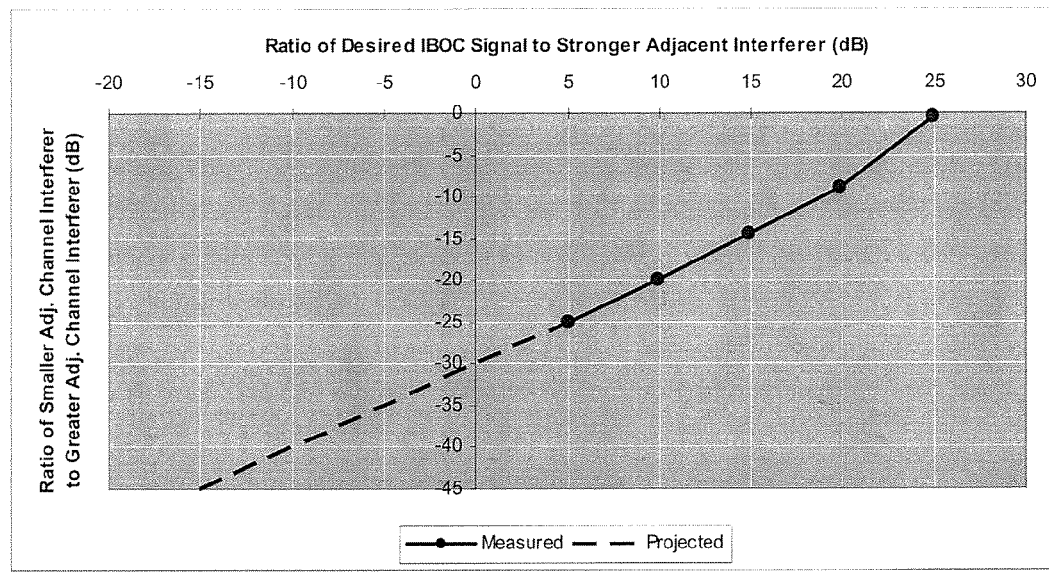
FIG. 5 is a graph of threshold interference ratios with dual adjacent-channel interferers of dissimilar power.

Under practical receiving conditions, the powers of interfering signals are different in every channel above and below the desired channel. From an examination of IBOC receiver behavior with pairs of adjacent channel interference at various powers, relative to the desired signal power, it was determined that the interferer of lesser power, when present, unexpectedly establishes an entirely new set of interference ratios compared to the single interferer case. This behavior has been simplified and charted in FIG. 5, showing the threshold of IBOC reception as a function of three parameters: the desired signal power; the adjacent interferer having the greater signal power; and the adjacent interferer having the lesser signal power. Since both lower- and upper-adjacent signals must be considered in this case, and because these signals individually may occur in any combination of ratios relative to the desired channel, the Y axis of the graph expresses the ratio of the desired carrier to greater (stronger) adjacent-channel signal, regardless of its lower- or upper-adjacency. So that the levels of both adjacent signals are considered, the X axis of the graph expresses the ratio of smaller (weaker) to the greater adjacent-channel signal. When these parameters are expressed in the manner described, the graph line at which failure of IBOC reception occurs approaches a straight line, where conditions above the line result in receive failure.

The measured ratios of IBOC failure may be extrapolated to a greater ratio of desired IBOC to stronger adjacent interferer, as illustrated by the dashed line in FIG. 5. It is evident that as the smaller adjacent interferer becomes very small (45 dB below the greater first adjacent interferer) that the ratio of desired to stronger adjacent interferer approaches −15 dB; this agrees well with the case of a single adjacent interferer described herein and shown in FIG. 3.

Prior to performing the IBOC DAB signal reception prediction, the following steps maybe taken, in any order:

1. Receiver performance data for dual first-adjacent interference are determined, as illustrated in FIG. 5, from which slope and intercept values are produced for the relationship between: (1) the ratio of the desired IBOC signal to the stronger IBOC interfering signal; and (2) the ratio of the smaller weaker adjacent channel interfering signal to the greater stronger adjacent channel interfering signal;

2. The receiver performance data for single first adjacent interference are determined, as illustrated in FIG. 3, to provide a minimum D/U signal ratio;

3. The IBOC receiver's RF signal power sensitivity is known or is determined (expressed for the desired host carrier); for example, this may be −77 dBm for reception.

To predict IBOC DAB reception, as in a computer model for a specific receive location, the following steps may be carried out in any order:

4. The desired analog host signal must exceed the IBOC receiver's RF sensitivity requirement, as determined in Step 3, above. Otherwise, no IBOC reception is predicted;

5. For any single adjacent-channel interferer, the ratio of the desired and undesired signals must exceed the minimum D/U ratio determined in Step 2, above. Otherwise, no IBOC reception is predicted;

6. For situations with dual-adjacent (upper and lower) interference, the level of the stronger undesired adjacent signal is referred to as "Umax" and the level of the weaker undesired adjacent signal is referred to as "Umin." The ratio of "Umin to Umax" is determined (a negative number, in dB) for the receive condition;

7. The ratio of the desired signal level to Umax, referred to as "D/Umax", is determined;

8. A minimum-allowable ratio of Umin to Umax is calculated from the formula D/Umax*SLOPE+INTERCEPT, as specified in Step 1 above. Using the data from FIG. 5 as an example, the slope is 1.4 and the intercept is 30;

9. IBOC reception is expected if the received Umin to Umax ratio (determined in Step 6) is less than the minimum-allowable ratio of Umin to Umax (determined in Step 8). Conversely, if the received Umin to Umax ratio is greater than the allowable Umin to Umax, then IBOC reception should fail.

Figure 6:
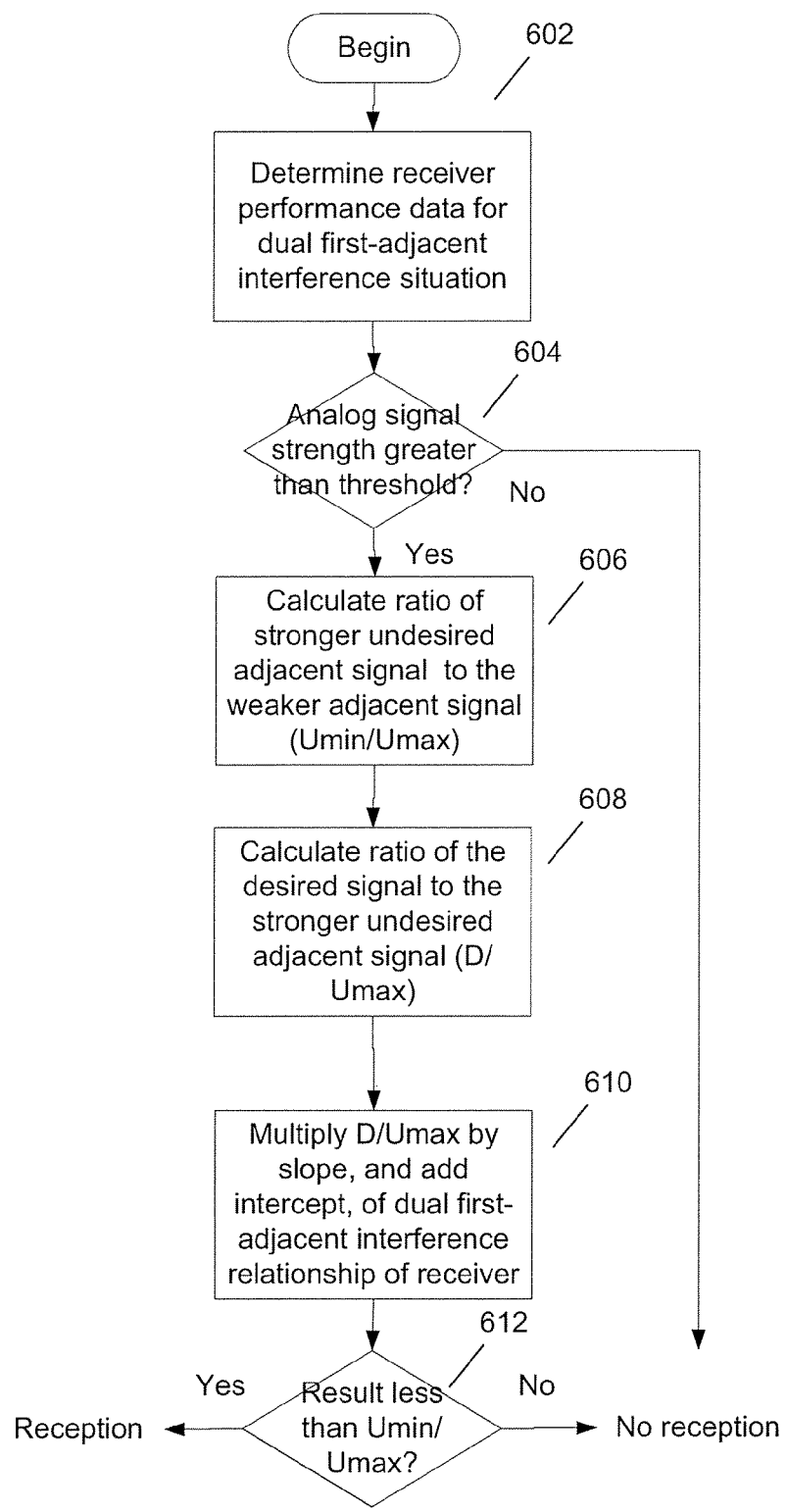
FIG. 6 is a flow diagram of the prediction model for a dual interferer situation.

FIG. 6 is a flow diagram describing the process for the dual adjacent interferer case. At step 602, receiver performance data with respect to adjacent signals are determined as described above. From these data a relationship can be defined as shown in FIG. 5. Alternatively, standard, average, or default values can be used instead of receiver-specific values.

At step 604, it is determined if the received analog signal strength is greater than a minimum threshold. If the signal strength is greater than this threshold, then at step 606 the ratio of the stronger undesired adjacent signal to the weaker undesired adjacent signal is calculated (Umin/Umax); otherwise it is determined that there should be no reception of the IBOC DAB signals.

At step 608, the ratio of the signal level of the desired signal to the stronger undesired adjacent signal level is calculated (D/Umax). At step 610, D/Umax is multiplied by the slope, and added to the intercept of the line representing the relationship illustrated in FIG. 5. This result is the compared with Umin/Umax (step 612) to make a prediction regarding reception. If the result is less than Umin/Umax, then there should be reception; otherwise not.

Figure 7:
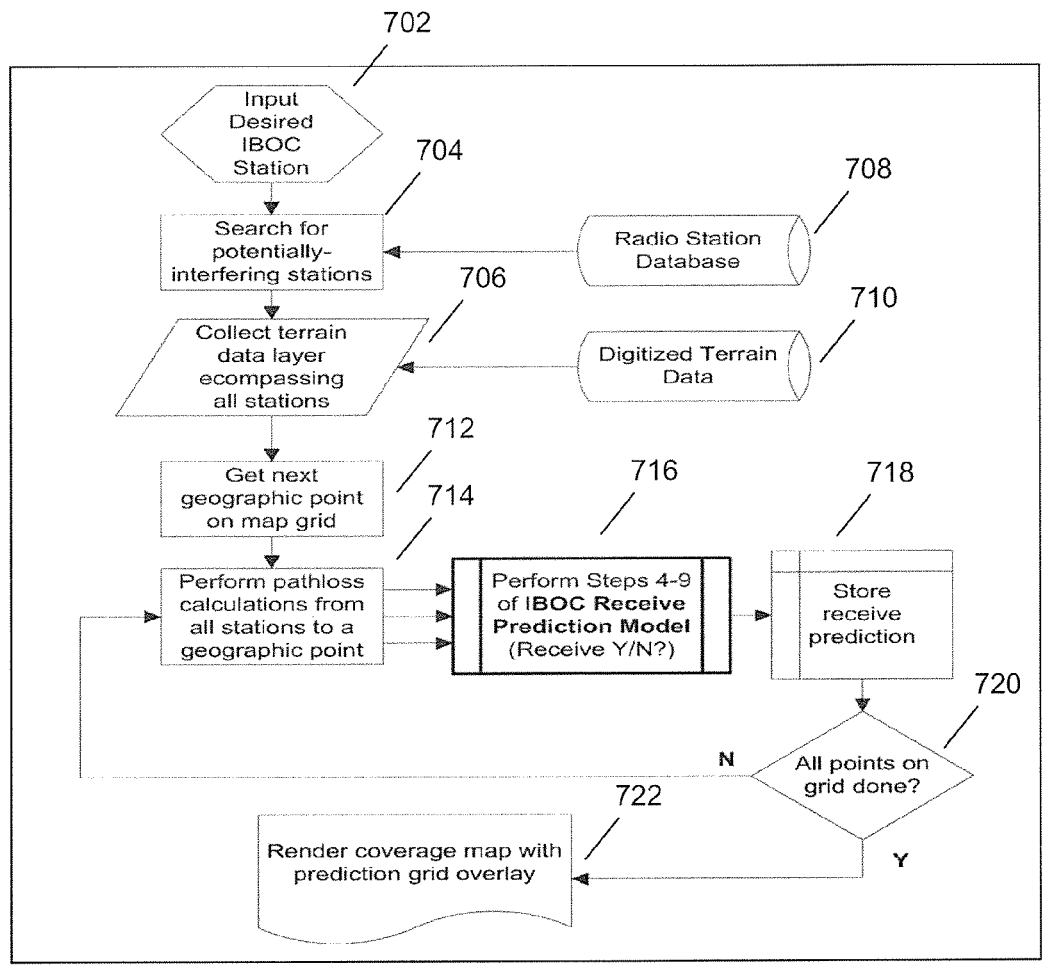
FIG. 7 is dataflow diagram showing the prediction model within a system including predicted field strengths and a graphical output.

FIG. 7 is a data flow diagram showing a prediction model within a system for predicting IBOC DAB signal reception. The IBOC DAB prediction model is herein incorporated into a computerized RF coverage prediction program. As discussed herein, Steps 1, 2 and 3 can be determined at any time before running the prediction model, and the numeric values determined by these steps would be supplied to the program's IBOC signal prediction model, which can perform the remaining six steps.

The dataflow model includes data 702 about an IBOC station. This can be information such as station frequency, location, type of signal (e.g., AM or FM), and transmitter characteristics and power. At block 704, the system is checked for potentially interfering stations, for example, from a radio station database 708. At block 706, terrain data 710 may be used to refine predicted field strength for use in the prediction model.

The system then cycles through each of the grid points, or any other set of points, within the area being tested for coverage, as shown in block 712. At block 714, pathloss calculations are performed using the terrain data and the station parameters. At block 716, the prediction model is used with the predicted field strengths (which may be adjusted by pathloss calculations) and a receive prediction is generated for the particular point. Once reception for all grid points has been calculated, a graphical map can be generated showing the predicted coverage area for IBOC DAB reception. An example map and further details are illustrated in FIG. 8.

Figure 8:
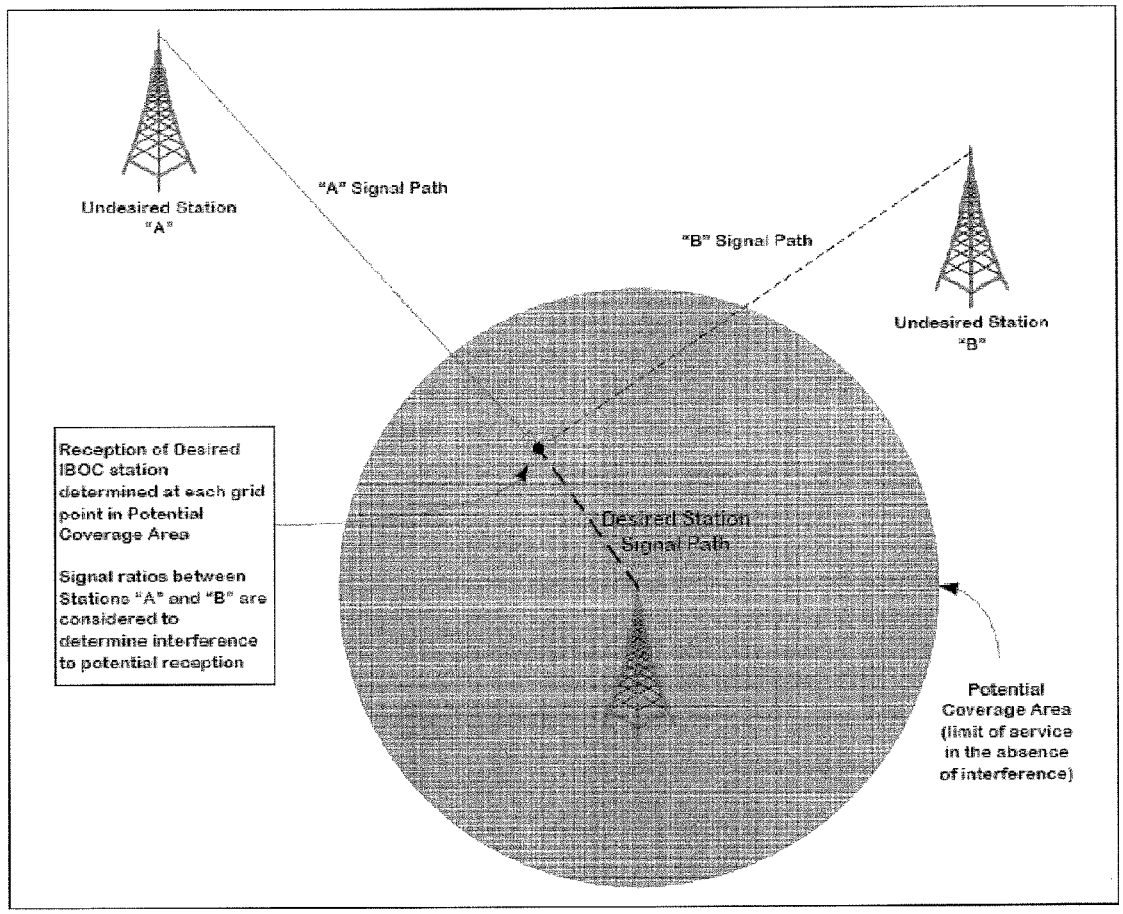
FIG. 8 is a diagram showing how the signals arriving from the desired and undesired stations is applied on a series of uniformly-spaced grid points to produce a visual output of the prediction model.

FIG. 8 illustrates an application of the prediction model with point-to-point predictions of pathloss in order to create a geographic representation of usable IBOC DAB coverage. The representation, or map, may be generated using the prediction model and real or predicted field strengths. The coverage areas of such a map may be quite irregular, depending on terrain and other conditions.

Depending on the decisions of the model, color codes may be assigned to each grid point, indicating whether IBOC reception is or is not predicted. The completed mosaic of color-coded coverage points may be overlaid on a geographic map showing communities, roads, rivers and lakes, place names, etc., and may be rendered as a composite map image.

Figure 9:
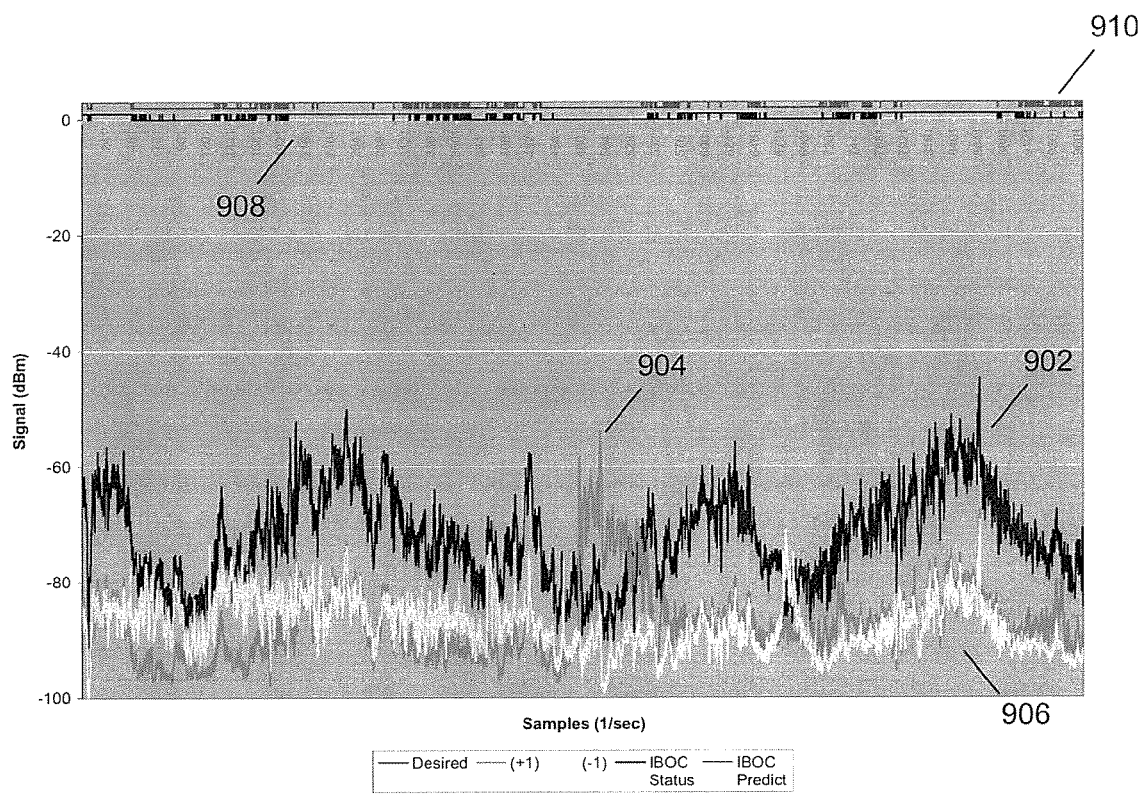
FIG. 9 is a diagram showing actual signal measurements of a desired IBOC station and two adjacent-channel interfering stations, confirming the accuracy of the prediction model.

FIG. 9 shows results generated by the prediction model of the invention with actual signal measurements. The data were collected from a moving vehicle over a period of nearly five hours. The desired signal power 902, and the upper- 904 and lower- 906 adjacent channel signal powers are shown, respectively. During vehicular reception of FM stations, large variations in signal level are normal, as are rapid changes in level due to Rayleigh fading. These variations are evident in FIG. 9. Higher graph lines indicate higher received signal power, expressed on a logarithmic scale in dBm (decibels relative to a milliwatt).

Graph 908 in FIG. 9 is the status of the IBOC receiver 908; a logic "high" indicates reception and a logic "low" or zero, indicates IBOC receive failure. Graph 910 in FIG. 9 shows the predictions for reception by a prediction model, using the same logical states as the actual receiver performance. By comparing graph 908 (actual reception performance) and graph 910 (predicted reception performance), it can be seen that a prediction model in accordance with embodiments of the invention gave an accurate prediction of reception greater than 88 percent of the time, with less than 5 percent false negatives and less than 6 percent false positives.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

What is claimed is:

1. A computer implemented method of predicting the reception of a desired in-band on-channel digital audio broadcast signal, the method comprising:
   (a) computing a first ratio of the field strength of a weaker undesired adjacent broadcast signal to the field strength of a stronger undesired adjacent broadcast signal;
   (b) computing a second ratio of the field strength of the desired in-band on-channel digital audio broadcast signal to the field strength of the stronger undesired adjacent broadcast signal;
   (c) computing a minimum allowable reception ratio based on the second ratio and the slope and intercept of a line, wherein the slope and intercept of the line is based on both (i) a plurality of ratios of a weaker adjacent broadcast signal to a stronger adjacent broadcast signal and (ii) a plurality of ratios of a desired in-band on-channel digital audio broadcast signals to a stronger adjacent broadcast signal;
   (d) predicting reception of the in-band on-channel digital audio broadcast signal when the computed minimum allowable reception ratio is less than the first ratio.

2. The method of claim 1, wherein the field strengths of the weaker undesired adjacent broadcast signal, stronger undesired adjacent broadcast signal, and desired in-band on-channel digital audio broadcast signal, are predicted field strengths.

3. The method of claim 2, wherein the predicted field strengths are based on operating parameters for a transmitter of the desired in-band on-channel digital audio broadcast signal, and terrain data.

4. The method of claim 1, wherein the weaker undesired adjacent broadcast signal is a lower adjacent broadcast signal and the stronger undesired adjacent broadcast signal is an upper adjacent broadcast signal.

5. The method of claim 1, further comprising predicting no reception of the desired in-band on-channel digital audio broadcast signal when the RF signal power of the desired signal is less than about −77 dBm.

6. The method of claim 1, wherein the slope of the line is about 1.4 and the intercept of the line is about 30.

7. The method of claim 1, wherein computing the minimum allowable reception ratio comprises multiplying the second ratio by the slope of the line and adding the result to the intercept of the line.

8. The method of claim 1, further comprising generating a map based on a plurality of predictions of reception of a desired in-band on-channel digital audio broadcast signal.

9. The method of claim 1, wherein the slope and intercept of the line are adjusted based on a receiver for which a reception prediction is being made.

10. A system for predicting the reception of a desired in-band on-channel digital audio broadcast signal, the system comprising:
   a processor for (a) computing a first ratio of the field strength of a weaker undesired adjacent broadcast signal to the field strength of a stronger undesired adjacent broadcast signal; (b) computing a second ratio of the field strength of the desired in-band on-channel digital audio broadcast signal to the field strength of the stronger undesired adjacent broadcast signal; (c) computing a minimum allowable reception ratio based on the second ratio and the slope and intercept of a line, wherein the slope and intercept of the line is based on both (i) a plurality of ratios of a weaker adjacent broadcast signal to a stronger adjacent broadcast signal and (ii) a plurality of ratios of a desired in-band on-channel digital audio broadcast signals to a stronger adjacent broadcast signal, wherein the system predicts reception of the in-band on-channel digital audio broadcast signal when the computed minimum allowable reception ratio is less than the first ratio.

11. The system of claim 10, wherein the field strengths of the weaker undesired adjacent broadcast signal, stronger undesired adjacent broadcast signal, and desired in-band on-channel digital audio broadcast signal, are predicted field strengths.

12. The system of claim 11, wherein the predicted field strengths are based on operating parameters for a transmitter of the desired in-band on-channel digital audio broadcast signal, and terrain data.

13. The system of claim 10, further comprising predicting no reception of the desired in-band on-channel digital audio broadcast signal when the RF signal power of the desired signal is less than about −77 dBm.

14. The system of claim 10, wherein the slope of the line is about 1.4 and the intercept of the line is about 30.

15. The system of claim 10, wherein computing the minimum allowable reception ratio comprises multiplying the second ratio by the slope of the line and adding the result to the intercept of the line.

16. The system of claim 10, further comprising a display for displaying a map generated from a plurality of predictions of reception of a desired in-band on-channel digital audio broadcast signal.

17. A computer implemented method of predicting the reception of a desired in-band on-channel digital audio broadcast signal among a plurality of undesired broadcast signals, wherein the desired in-band on-channel digital audio broadcast signal is an audio component of a hybrid broadcast signal that also includes an analog component, and wherein the plurality of undesired broadcast signals include at least a weaker adjacent signal and a stronger adjacent signal both of which interfere with the reception of the desired in-band on-channel digital audio broadcast signal, the method of predicting reception comprising:
   computing, using the field strength of the desired in-band on-channel digital audio component, the weaker adjacent signal, and the stronger adjacent signal, a prediction of reception of the desired in-band on-channel digital audio component at a particular location, wherein computing a prediction of reception comprises the steps of:
   (a) determining a linear relationship based on (i) a plurality of ratios of the field strength of a weaker adjacent signal to a stronger adjacent signal and (ii) a plurality of ratios of a desired in-band on-channel digital audio component to a stronger adjacent signal;
   (b) determining the slope and intercept of the linear relationship;
   (c) generating a result by multiplying the slope by a ratio, wherein the ratio is the field strengths of the desired in-band on-channel digital audio component at particular location, to the stronger adjacent signal at that location;
   (d) adding to the result the intercept of the linear relationship; and
   (e) predicting reception when the result is less than the ratio of the field strength of the weaker adjacent signal to the stronger adjacent signal at the location.

18. The method of claim 17, wherein the field strengths of the weaker adjacent signal, stronger adjacent signal, and desired in-band on-channel digital audio components, are predicted field strengths.

19. The method of claim 18, wherein the predicted field strengths are based on operating parameters for a transmitter of the desired in-band on-channel digital audio broadcast component, and terrain data.

20. The method of claim 17, wherein the slope of the linear relationship is about 1.4 and the intercept of the line is about 30.

21. The method of claim 17, further comprising generating a map based on a plurality of predictions of reception of a desired in-band on-channel digital audio component.

22. The method of claim 17, wherein the linear relationship is adjusted based on a receiver for which a reception prediction is being made.

23. A system for predicting the reception of a desired in-band on-channel digital audio broadcast signal among a plurality of undesired broadcast signals, wherein the desired in-band on-channel digital audio broadcast signal is an audio component of a hybrid broadcast signal that also includes an analog component, and wherein the plurality of undesired broadcast signals include at least a weaker adjacent signal and a stronger adjacent signal both of which interfere with the reception of the desired in-band on-channel digital audio broadcast signal, the system comprising:
   a processor for computing, using the field strength of the desired in-band on-channel digital audio component, the weaker adjacent signal, and the stronger adjacent signal, a prediction of reception of the desired in-band on-channel digital audio component at a particular location, the processor (a) determining a linear relationship based on (i) a plurality of ratios of the field strength of a weaker adjacent signal to a stronger adjacent signal and (ii) a plurality of ratios of a desired in-band on-channel digital audio component to a stronger adjacent signal; (b) determining the slope and intercept of the linear relationship; (c) generating a result by multiplying the slope by a ratio, wherein the ratio is the field strengths of the desired in-band on-channel digital audio component at particular location, to the stronger adjacent signal at that location; (d) adding to the result the intercept of the linear relationship, wherein the system predicts reception when the result is less than the ratio of the field strength of the weaker adjacent signal to the stronger adjacent signal at the location.

24. The system of claim 23, wherein the field strengths of the weaker adjacent signal, stronger adjacent signal, and desired in-band on-channel digital audio components, are predicted field strengths.

25. The system of claim 24, wherein the predicted field strengths are based on operating parameters for a transmitter of the desired in-band on-channel digital audio broadcast component, and terrain data.

26. The system of claim 23, wherein the slope of the linear relationship is about 1.4 and the intercept of the line is about 30.

27. The system of claim 23, further comprising a display for displaying a map generated from a plurality of predictions of reception of a desired in-band on-channel digital audio component.

28. The system of claim 23, wherein the linear relationship is adjusted based on a receiver for which a reception prediction is being made.

* * * * *

UNITED STATES PATENT AND TRADEMARK OFFICE
CERTIFICATE OF CORRECTION

PATENT NO.        : 8,374,556 B2                                              Page 1 of 1
APPLICATION NO. : 12/739260
DATED             : February 12, 2013
INVENTOR(S)       : John C. Kean It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this

First Day of September, 2015

Michelle K. Lee
*Director of the United States Patent and Trademark Office*